United States Patent [19]
Nishino et al.

[11] 3,910,683
[45] *Oct. 7, 1975

[54] OPTICAL LOW-PASS FILTER

[75] Inventors: Hisashi Nishino; Teruo Hosokawa, both of Sakai; Ikuro Hioki, Kishiwada, all of Japan

[73] Assignee: Minolta Camera Kabushiki Kaisha, Osaka, Japan

[ * ] Notice: The portion of the term of this patent subsequent to Oct. 30, 1990, has been disclaimed.

[22] Filed: July 13, 1973

[21] Appl. No.: 379,013

Related U.S. Application Data

[63] Continuation-in-part of Ser. No. 164,757, July 21, 1971, Pat. No. 3,768,888.

[30] Foreign Application Priority Data

July 28, 1970  Japan............................... 45-65418

[52] U.S. Cl. .......... 350/162 SF; 350/162 R; 358/44
[51] Int. Cl.² ........................................ G02B 5/18
[58] Field of Search .......... 350/162 SF, 162 R, 311, 350/314, 316; 178/5.4 ST, 5.2 D

[56] References Cited
UNITED STATES PATENTS

| | | | |
|---|---|---|---|
| 2,733,291 | 1/1956 | Kell | 350/162 SF |
| 3,681,519 | 8/1972 | Larsen et al. | 350/162 SF |
| 3,756,695 | 9/1973 | Mino et al. | 350/162 SF |
| 3,768,888 | 10/1973 | Nishino et al. | 350/162 SF |

*Primary Examiner*—Ronald J. Stern
*Assistant Examiner*—Jon W. Henry
*Attorney, Agent, or Firm*—Wolder & Gross

[57] ABSTRACT

An optical low-pass filter in the form of a rectangular wave phase grating including at least two sets of parallel phase retardation laminae, the laminae in each set being at an angle to the laminae of the other set. The optical filter is disposed in an optical system provided with a color-encoding filter, such as a single tube color televsion camera, and the high frequency components of an image on the color-encoding filter are attenuated below a predetermined level. The degree of blur which is larger than the value calculated from the grating period of the color-encoding filter is effected by a first set of laminae and beats appearing, in the image defocused on the color-encoding filter due to the laminae is attenuated by another set or the other set of laminae.

3 Claims, 11 Drawing Figures

OPTICAL LOW-PASS FILTER

REFERENCE TO RELATED PATENT APPLICATION

The present application is a continuation-in-part of patent application Ser. No. 164,757, filed July 21, 1971 now U.S. Pat. No. 3,768,888.

BACKGROUND OF THE INVENTION

The present invention relates to an optical system having a color-encoding filter means, for example, in a single tube color television camera, and an optical low-pass filter in an objective lens system for attenuating beats appearing on the television picture, and more particularly, it relates to and contemplates an optical system in which the optical low-pass filter is formed of a rectangular wave phase grating including a plurality of sets of laminae for introducing phase retardation, the laminae of each set being arranged in parallel with each other and the laminae of different sets being arranged at an angle with each other.

In the prior art, for example, in television cameras of a single image tube or two image tube type, it has been well known to use a color-encoding filter means disposed in the light path of an optical system so as to obtain three primary color signals.

In such an optical system in a television camera, it has been also well known that a beat occurs on the picture image in the color television which is due to the fact that a circuit for detecting color signals in a color television system misdetects high frequency components with regards to or along the scanning direction of the image tube in a picture image on the color encoding filter as chrominance signals.

In order to attenuate such a beat it is required that high frequency components of the objective image on the color-encoding filter are attenuated below a predetermined level. In order to satisfy this demand, in the optical system there is provided an optical low-pass filter to effect a degree of blur larger than the value calculated from the grating period of the color-encoding filter to the objective image on the color-encoding filter, regardless of the $f$-number and the diaphragm aperture value of the objective lens system.

As such an optical low-pass filter, it has been known that a polyhedron prism, nylon mesh, or the like has been used, however, each of these is highly difficult to manufacture and also incorporate into the photographic lens, and is accordingly not suitable for practical use.

A unique low-pass filter composed of an asymmetrical rectangular wave phase grating in which on a transparent base plate laminae of equal widths for giving a phase retardation are regularly disposed with identical pitches in an identical direction has been disclosed in the U.S. patent application Ser. No. 161,454 filed July 12, 1971 now U.S. Pat. No. 3,756,695 and having the same assignee as the present application. Said optical low-pass filter has the advantage of being simple to manufacture because it can be obtained through the conventional vacuum evaporation method and it is easy to incorporate it into the objective lens. While it has the drawbacks in that when a degree of blur to the image of the principal object to be focused on the color-encoding filter occurs beyond a predetermined level, the beats due to other kinds of high frequency components undesirably appear by inserting said low pass filter.

The present invention aims to remove the above drawbacks and provide an optical low-pass filter in which all object images which are focused or not focused on the color-encoding filter cause no beats.

OBJECTS OF THE INVENTION

One object of the present invention is to provide an optical low-pass filter means which is applied to an optical system having an objective lens and a color-encoding filter means, and that prevents the occurrance of beats effected in picture images.

Another object of the present invention is to provide an optical low-pass filter means which is employed in an optical system having an objective lens and a color-encoding filter, and that forms no beats in the object images of said objective lens which are focusing or not focusing on said color filter plane.

Further, another object of the present invention is to provide an optical low-pass filter which attains the above-mentioned objects and is easy to manufacture and insert into an optical system.

The other objects of the present invention will be apparent from the following detailed description.

SUMMARY OF THE INVENTION

In order to attain the above-mentioned objects, the present invention contemplates the provision of an optical system having a color-encoding filter means for use, for example, in a single tube color television camera and an optical low-pass filter in an objective lens system for attenuating beats which appear on the television picture, wherein the optical low-pass filter is a rectangular wave phase grating including a plurality of sets of laminae for introducing phase retardation, the laminae in each set being arranged in parallel with each other and the laminae of different sets being arranged at an angle to each other. The high frequency components of an objective image focused on the color-encoding filter means are attenuated less than a predetermined level by means so arranged that there is imparted to the image focused on the color-encoding filter means a degree of blur always larger than the value calculated from the grating period of the color-encoding filter means, and other high frequency components effected in an object image defocused on the color-encoding filter means are prevented to appear.

Through a rectangular wave phase grating having one set of laminae for introducing phase retardation an image of a point focused on a predetermined position by the objective lens system turns to a Fraunhofer order diffraction image at a position distant from the focusing point, having the spread in the direction of that of the laminae, namely, in the direction at right angles to the direction along the laminae instead of a single point image. Depending upon the width of spread of said diffraction image, gradation of said focus image evolves.

However, in the case of a defocused image, which is observed at a position which is a predetermined distance from the focused positon, interferenced striped patterns occur, and when the striped interferenced patterns are formed on the color-encoding filter and the period of the striped patterns approximate to the period of the color-encoding filter wrong color signals are produced, and as a result, in an apparatus making use of such an optical system, for example, in a single tube color television camera system, beats occur on the television picture.

However, in the present invention another set of laminae are arranged in parallel with each other for introducing phase retardation, and the laminae of the set being arranged at an angle to that of the first set can attenuate striped interference patterns and wrong color signals due to high frequency components in the striped patterns.

DESCRIPTION OF THE PREFERRED EMBODIMENT

Figure 1:
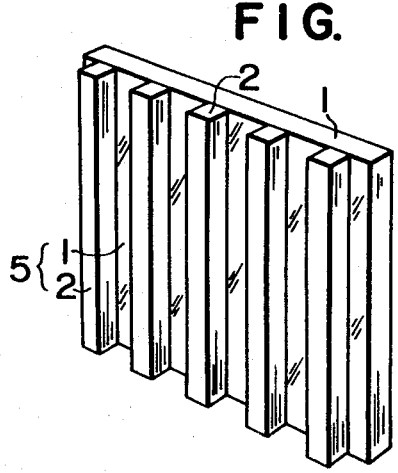
FIG. 1 is a perspective view of a phase plate including a rectangular wave phase grating having a set of laminae.
Figure 2:
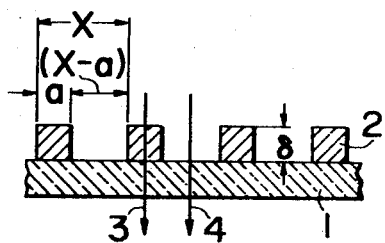
FIG. 2 is a section view along the arranged direction of the laminae.

FIG. 1 and FIG. 2 show an optical low-pass filter composed of a rectangular phase grating 5, which constitutes a part of an embodiment in accordance with the present invention and has its phase disposition in a single direction, wherein on a transparent clear base plate 1, transparent clear laminae 2 are arranged in parallel with each other and in which the grating pitch of the laminae 2 is $X$ and the width of said laminae 2 is $a$, and the space between adjacent laminae 2 is $X-a$. Also, there is provided the phase retardation effected by said laminae 2 $\delta$. Between light ray 3 through lamina 2 and light ray 4 only and through base plate 1, the phase difference $\delta$ results.

As described in the above identified U.S. Pat. No. 3,756,695, the laminae 2 are advantageously of the same size and dimensioned to provide a phase $\delta$ selected from the range given by the following formulae:
$$1-0.35(q+1) \geq \cos\delta \geq 1-0.65(q+1)$$
wherein $q$ is the ratio equal to the total sum of areas not covered by said optical elements or laminae divided by the total sum of the areas covered by the optical elements or laminae, said ratio being not less than 1. While the period or interval between laminae is advantageously constant it may vary slightly, but, in any event, it should satisfy the formulae herein set forth with the respective mean dimensions being employed. Moreover, the laminae may be of trapezoidal transverse cross section as well as of rectangular transverse cross section. The laminae of trapezoidal transverse cross section may be of the dimensions and configuration described in the article entitled "Optical Low-Pass Filter for a Single Vidicon Color Television Camera" appearing in the Journal of the SMPTE, April 1972 issue, volume 81 and particularly FIG. 6 thereof on page 283. Moreover, as described in the above identified application the following optical element conditions are advantageously met:

$$1-0.35\frac{X}{A} \leq \cos\delta \geq 1-0.65\frac{X}{A}$$

in which $A=a$ (when $a \leq X-a$), $A=X-a$ (when $a \geq X-a$) $X$ is the grating period of the stripe filter and $a$ is the lamina width. Further, the filter transparent support may be a lens face.

Figure 3:
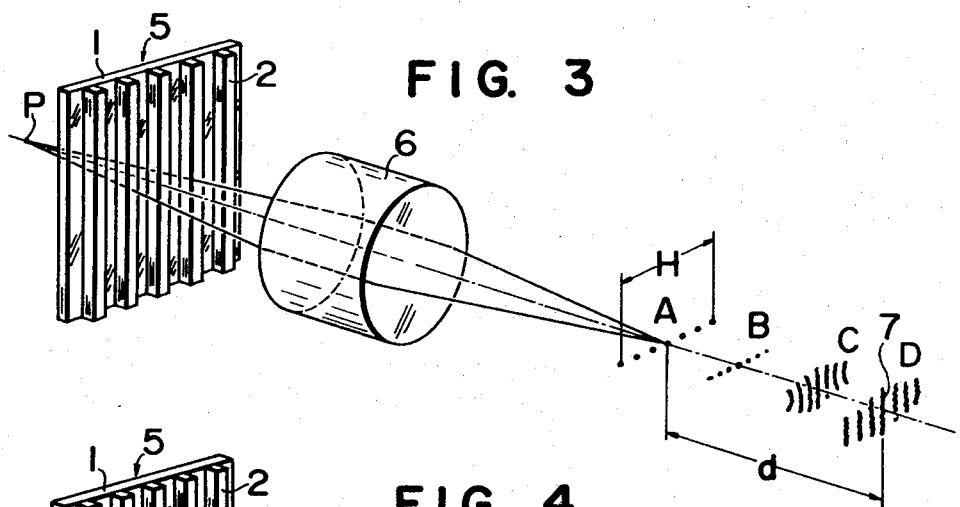
FIG. 3 is a perspective view showing diagramatically various diffraction images formed at various points through a rectangular phase grating and an objective lens system.

FIG. 3 shows states of various images formed at various points through a rectangular phase grating 5 and an objective lens system 6 and thereby the object point P on the optical axis of objective lens 6 forms various images. When the optical system 6 is not provided with optical low-pass filter 5, the object point P forms a point image on its conjugate point through the objective lens system 6, however, when optical system 6 is provided with a low-pass filter 5, the image of object point P is effected through objective lens system 6 and low-pass filter 5 passes through said conjugate point and brings about a diffraction image of the Fraunhofer order composed of a plurality of point images spread in a straight line in the direction along which the gratings of low-pass filter 5 are arranged onto plane A at right angles to the optical axis. Through pattern width H of this diffraction image a blur appears on the image. When said width H is broader than about twice a grating period of a color-encoding filter for forming in succession a striped pattern, for example, of blue, green, red and white as shown in FIG. 8, interference between said image and the color-encoding filter can be prevented.

Figure 7:
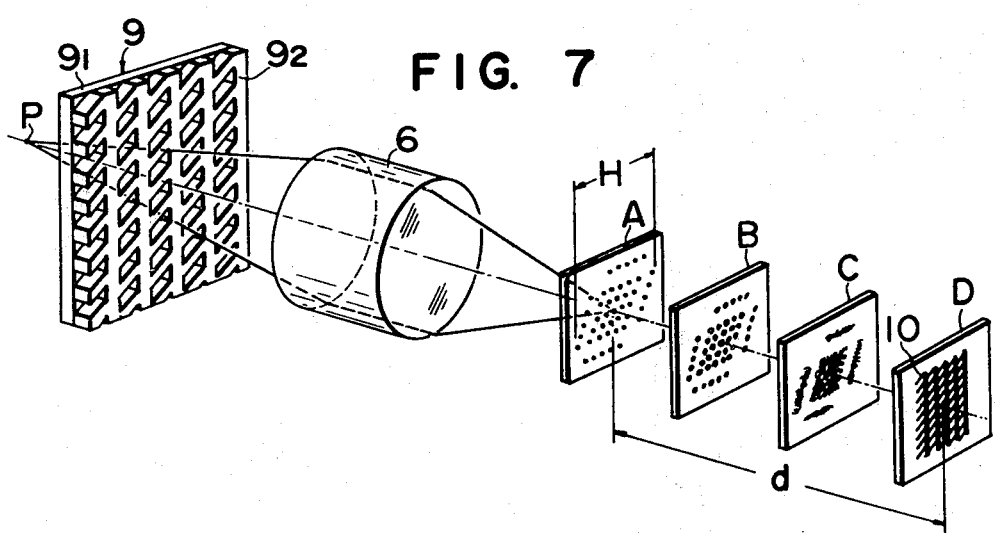
FIG. 7 is a perspective view showing diagrammatically diffraction images on the focal plane and the defocus plane in the case where the optical low-pass filter in said embodiment is fitted in the objective lens.

The fact described above is in the event that the image point is on the focal plane A of objective lens system 6 relative to object point P. However, when this is on the plane B or C spaced from the focal plane A, an interference striped pattern occurs as shown in FIG. 3. and a very clear interferenced striped pattern 7 occurs in the striped pattern in the same direction as phase grating 2 and in the spread in the direction at right angles to said phase grating 2, on the plane D separated as far as specfic length $d$ from focal plane A, as shown in FIG. 7.

Figure 8:
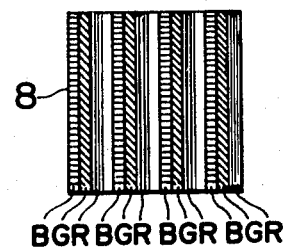
FIG. 8 is a front view showing one example of a color-encoding filter.

When the period of said diffraction striped pattern 7 is approximate the grating period of the color-encoding filter 8 in FIG. 8, interference occurs between them, and if such an optical system is used in a color television camera, a beat in a color pattern occurs in respect to an image focused distant from the specific focusing point.

As to said phenomenon, as the result of experiment, in the case that objective lens 6 is moved forwardly, a certain distance from the position where the focusing point of P is focused on plane A, the interference appears on the image.

Figure 5:
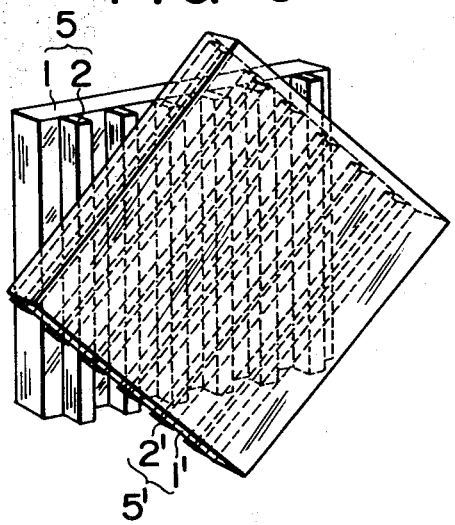
FIG. 5 is a perspective view of one embodiment of the optical low-pass filter in accordance with the present invention, in which two sets of rectangular phase gratings are disposed so that both sets of laminae are at an angle to each other.

Thus, in accordance with the present invention, as shown in FIG. 5, two rectangular wave phase gratings 5 and 5' each having a base plate 1 or 1' and a set of laminae 2 or 2' arranged in parallel with each other on respective base plates 1 and 1' as shown in FIG. 1 and FIG. 2 and are superimposed on each other so that base plates 1 and 1' are parallel with each other and each laminae 2 and 2' on different base plates 1 and 1' are arranged to cross at an angle to each other to form one optical low-pass filter.

Figure 4:
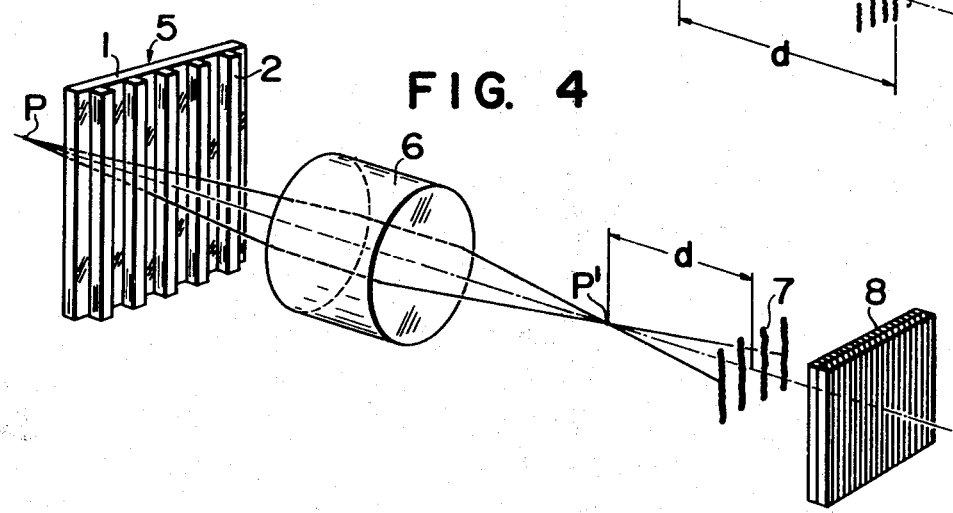
FIG. 4 is a perspective view showing diagramatically the phase where the striped diffraction patterns of an image shown in FIG. 3 and the grating patterns of the color-encoding filter bring about interference therebetween.

In such a low pass filter having two sets of laminae for introducing phase retardation, the interferenced striped pattern 7 as shown in FIGS. 3 and 4 which appears in the position D distant from the position A to be focused by objective lens through phase grating 5 is prevented by phase grating 5' crossing phase grating 5.

Figure 6:
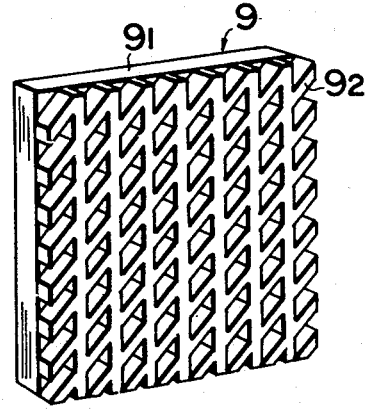
FIG. 6 is a perspective view of another embodiment in accordance with the present invention having a phase plate including two sets of rectangular phase gratings in which laminae in each set is parallel with each other and the laminae of different sets are at an angle to each other on a single base plate.

FIG. 6 shows another embodiment of the optical low-pass filter in accordance with the present invention. The low-pass filter 9 includes a single base plate $9_1$ and striped pattern $9_2$ having two sets of laminae as a rectangular phase grating laminated on base plate $9_1$ in which the laminae of each set are arranged in parallel with each other and the laminae of the different sets are arranged at an angle to each other.

FIG. 7 shows the appearances of the diffraction images on focusing plane A and planes B, C, D which are spaced certain distances from plane A of point image P on the optical axis through an optical system including objective lens system 6 and the optical low-pass filter 9 shown in FIG. 6, and diffraction striped patterns 10 generated on plane D in FIG. 7 which corresponds to plane D in FIG. 3 bring about no interference between them and the color encoding filter 8 shown in FIG. 4 and FIG. 8.

Therefore, in a single tube color television camera, and the like, making use of an image forming optical system having a color encoding filter 8 and provided with said optical low-pass filter, the generation of color striped patterns on the television picture which is effected by interference between object images which are focused on the plane to be focused and color encoding filter 8 can be removed as a matter of course. Also the generation of color striped patterns caused by diffraction striped patterns generated secondarily by object images which are focused on a plane spaced from the plane to be focused and the color encoding filter 8 can be removed as well.

Figure 9:
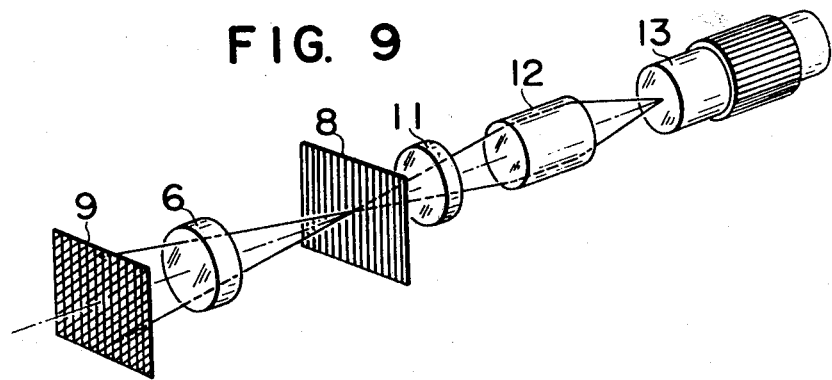
FIG. 9 is a perspective view showing the essential portions of an optical system for a single tube color television camera in accordance with the present invention.
Figure 11:
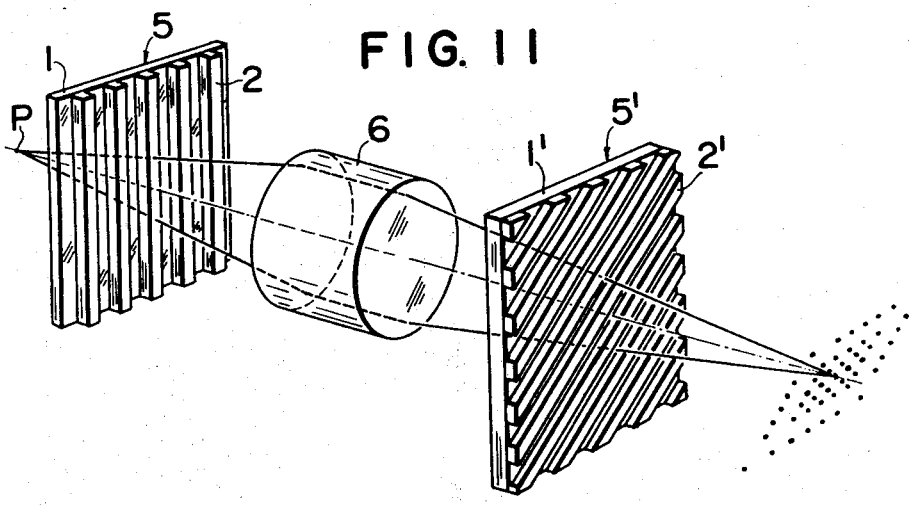
FIG. 11 is a perspective view of an optical system in further another embodiment in accordance with the present invention.

FIG. 9 shows an example of the application of the optical system including an optical low-pass filter, in accordance with the present invention, to an optical system for a single tube television camera wherein an object image is formed on a color-encoding filter 8, as shown in FIG. 8, by objective lens system 6 through optical low-pass filter 9, wherein said object image is separated into picture elements of three primary colors — blue, green and red —, and said separated picture image is formed on the plane of image tube 13 by field lens 11 and relay lens 12, whereby by scanning this the color signal of the picture image is obtained. In this case, the optical low-pass filter 9 is only required to be disposed not only in the position of the pupil of objective lens system 6, but also in the front or rear of said objective lens system 6; also, can be disposed as shown in FIG. 11.

Figure 10:
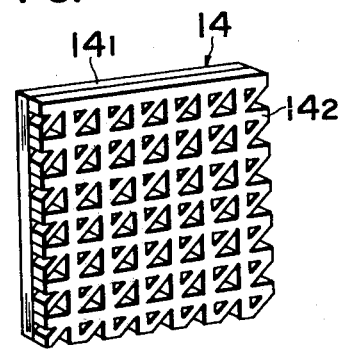
FIG. 10 is a perspective view of an optical low-pass filter of another embodiment in accordance with the present invention.

In the description of the embodiment and the applied example disclosed herein before, the color-encoding filter employs three repetitive and successive primary colored stripes in parallel with each other in one direction. As a result, the optical low-pass filter including two rectangular wave phase gratings 5 and 5' each having a set of laminae are arranged in parallel with each other on respective parallel base plates and the laminae on the different base plates are at an angle to each other as shown in FIG. 5. Alternatively a phase striped pattern having two sets of laminae in which laminae in each set are arranged in parallel with each other and laminae of different set are arranged at an angle to each other as shown in FIG. 6. Any beat effected by interference between a focused image or a defocused image on the color-encoding filter and color stripes of the color encoding filter can be completely removed. However, it is necessary that the optical low-pass filter 14 including one base plate $14_1$ and a striped pattern $14_2$ having three sets of laminae for introducing phase retardation is laminated on base plate $14_1$. In the laminae each set is parallel with each other and the laminae of different sets are oblique to one another as shown in FIG. 10 is employed. Alternatively the optical low-pass filter 5 formed with two rectangular wave phase gratings one of which having a set of laminae on the base plate as shown in FIG. 1 and the other of which having two sets of laminae on the base plate as shown in FIG. 6 are superimposed on each other so that the set of laminae of the former is arranged to be oblique to both sets of laminae of the latter.

Thus, by arranging one set of laminae for introducing phase retardation obliquely to the other set of laminae, each time when sets of color striped patterns are at an angle to one another in the color-encoding filter are increased by one, interference between diffraction image patterns of Fraunhofer order and Fresnel order and the color-encoding filter can be eliminated.

We claim:

1. In an optical system of the type having a color-encoding filter means disposed in the light path of said optical system and serving to spatially modulate at least two color images, the optical system comprising filter means including a plurality of sets of laminae for introducing phase retardation, laminae in each set being arranged in parallel with each other and disposed at an angle to the laminae of at least one other set, and laminae in a set having the same size to provide phase retardations selected from the range given by the following formula:

$$1 - 0.35(q+1) \geqq \cos\delta \geqq 1 - 0.65(q+1)$$

wherein $q$ is the ratio equal to the total sum of areas not covered by said laminae divided by the total sum of areas covered by the laminae, said ratio being not less than 1, each set of laminae being respectively mounted on a transparent base plate to form a low-pass filter, and an objective lens on both sides of which the low-pass filters are disposed perpendicularly to the optical axis of the objective lens.

2. In an optical system of the type having a color encoding filter means disposed in the light path of said optical system and serving to spatially modulate at least two color images, the optical system comprising low-pass filter means including a pair of low-pass filters, each of said filters including a transparent support and optical means disposed on said transparent support for introducing phase retardation to light transmitted through the filter;

said optical means having an upper surface and being so formed that the section of one side of the filter taken along in at least one direction is the shape of rectangular wave in which the width of each projection and the space between adjoining projections are respectively equal to each other;

and said optical means having the size in the direction perpendicular to the upper surface thereof to provide phase retardation $\delta$ selected from the range given by the following formula:

a. $\cos \delta \leq 1 - 0.35 \, (q+1)$
b. $\cos \delta \geq 1 - 0.65 \, (q+1)$ under the conditions that the ratio of both formula (a) and (b) are met, simultaneously, and wherein the character $q$ is the ratio between the total sum of areas on the upper surface of said optical means on the transparent support, said ratio being selected to be not less than 1; said filters being disposed at an angle to each other.

3. In an optical system of the type having a color encoding filter means disposed in the light path of said optical system and serving to spatially modulate at least two color images; the optical system comprising low-pass filter means including a pair of low-pass filters, each of said low-pass filters including a transparent support and a plurality of optical elements disposed on said support for introducing phase retardation in light transmitted through the filter;

each of said optical elements being composed of a transparent lamina continuous in one direction and having a flat upper surface and side surfaces perpendicular thereto, said optical elements being arranged in parallel to each other so that the section of one side of the filter taken along in the direction normal to the longitudinal direction of the laminae is the shape of rectangular wave in which the width of each projection $a$ and the space between adjoining projections are respectively equal to each other, and that a phase grating filter is defined;

and each of said optical elements being of a size to provide a phase retardation $\delta$ selected from the range given by the following formula:

(a) $\cos \delta \leq 1 - 0.35 \, \dfrac{X}{A}$ (b) $\cos \delta \geq 1 - 0.65 \, \dfrac{X}{A}$ in which
$A = a$ (when $a \leq X - a$)
$A = X - a$ (when $a \geq X - a$)

under the conditions that the ratio of both formula (a) and (b) are met simultaneously, and the character $X$ is the grating period of the low-pass filter, the laminae on one of said filters being oblique to the laminae of the other filter.

* * * * *